(12) United States Patent
Cihula

(10) Patent No.: US 10,109,141 B2
(45) Date of Patent: Oct. 23, 2018

(54) METHOD AND APPARATUS FOR ESTABLISHING TRUST IN SMART CARD READERS

(75) Inventor: Joseph F. Cihula, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 3067 days.

(21) Appl. No.: 10/746,077

(22) Filed: Dec. 24, 2003

(65) Prior Publication Data

US 2005/0149457 A1  Jul. 7, 2005

(51) Int. Cl.
| | | |
|---|---|---|
| *G06F 17/00* | (2006.01) | |
| *G07F 7/10* | (2006.01) | |
| *G06Q 20/34* | (2012.01) | |
| *G06Q 20/36* | (2012.01) | |
| *G06Q 20/40* | (2012.01) | |
| *G07F 7/08* | (2006.01) | |
| *G07F 7/12* | (2006.01) | |

(52) U.S. Cl.
CPC ......... *G07F 7/1008* (2013.01); *G06Q 20/341* (2013.01); *G06Q 20/367* (2013.01); *G06Q 20/4016* (2013.01); *G06Q 20/40975* (2013.01); *G07F 7/08* (2013.01); *G07F 7/12* (2013.01)

(58) Field of Classification Search
USPC ..................................................... 705/50–80
See application file for complete search history.

(56) References Cited

U.S. PATENT DOCUMENTS

| | | | | |
|---|---|---|---|---|
| 3,649,910 | A * | 3/1972 | Vinsani et al. | 714/33 |
| 4,746,788 | A * | 5/1988 | Kawana | 235/380 |
| 5,204,663 | A * | 4/1993 | Lee | 340/5.28 |
| 5,721,781 | A * | 2/1998 | Deo et al. | 705/67 |
| 5,861,614 | A * | 1/1999 | Gardner | 235/379 |
| 5,970,143 | A * | 10/1999 | Schneier et al. | 713/181 |
| 5,978,588 | A | 11/1999 | Wallace | |
| 6,044,350 | A * | 3/2000 | Weiant et al. | 705/1 |
| 6,134,328 | A * | 10/2000 | Cordery et al. | 380/55 |
| 6,278,783 | B1 * | 8/2001 | Kocher et al. | 380/277 |
| 6,539,092 | B1 * | 3/2003 | Kocher | 380/252 |
| 6,776,332 | B2 * | 8/2004 | Allen et al. | 235/380 |
| 6,826,267 | B2 * | 11/2004 | Daum et al. | 379/102.03 |
| 2001/0053220 | A1 * | 12/2001 | Kocher et al. | 380/29 |
| 2002/0194483 | A1 * | 12/2002 | Wenocur et al. | 713/185 |
| 2003/0109938 | A1 * | 6/2003 | Daum et al. | 700/11 |
| 2003/0145313 | A1 | 7/2003 | Kalogeropulos | |
| 2003/0188158 | A1 * | 10/2003 | Kocher | 713/161 |
| 2004/0124246 | A1 * | 7/2004 | Allen et al. | 235/492 |
| 2004/0250066 | A1 * | 12/2004 | Di Luoffo et al. | 713/168 |
| 2006/0015938 | A1 * | 1/2006 | Wlodarczyk | 726/22 |
| 2006/0045264 | A1 * | 3/2006 | Kocher et al. | 380/37 |

FOREIGN PATENT DOCUMENTS

| | | | |
|---|---|---|---|
| EP | 0735468 | A2 | 10/1996 |
| WO | WO-2006074576 | A1 | 7/2006 |

\* cited by examiner

*Primary Examiner* — John W Hayes
*Assistant Examiner* — John M Winter
(74) *Attorney, Agent, or Firm* — Compass IP Law PC

(57) ABSTRACT

A method for managing a smart card system includes testing a smart card reader for trustworthiness. An indication of the trustworthiness is provided via a smart card.

28 Claims, 7 Drawing Sheets

METHOD AND APPARATUS FOR ESTABLISHING TRUST IN SMART CARD READERS

FIELD

An embodiment of the present invention relates to smart cards. More specifically, an embodiment of the present invention relates to a method and apparatus for establishing trust in smart card readers.

BACKGROUND

Many smart cards are cards embedded with memory and a processor that allows data to be stored and transacted between parties. The data may, for example, be associated with a value and/or information. The data may be transacted via a smart card reader that is part of a computing system. Today, smart cards have applications in industries such as healthcare, banking, entertainment, and transportation.

In order to protect their data, some smart cards require user authentication before releasing the data to a smart card reader. The user authentication may involve requesting personal information from a user that is compared with stored personal information on the smart card. The personal information may range from non-physical types of information such as personal identification numbers (PINs) or passwords to more personal types of information such as biometrics. Biometrics may include, for example, blood vessel patterns in a retina, fingerprints, DNA and other biological properties of the user. Unlike non-physical types of information, biometrics are unique to the user. If compromised, biometrics may be difficult if not impossible for a user to change.

Most public smart card systems today are unconditionally trusting of smart card readers. These smart card systems do not provide a mechanism for which a user can determine whether a smart card reader is trustworthy or reliable. This may become problematic when sensitive personal information such as biometrics is provided to an untrustworthy or unreliable smart card reader during user authentication. One approach to protecting personal information involves placing user authentication hardware directly on the smart card instead of requiring the reader to have it. This solution, however, increases the overall size and the cost of manufacturing the smart card, which is undesirable.

BRIEF DESCRIPTION OF THE DRAWINGS

The features and advantages of the embodiments of the present invention are illustrated by way of example and are by no means intended to limit the scope of the present invention to the particular embodiments shown, and in which.

DETAILED DESCRIPTION

In the following description, for purposes of explanation, specific nomenclature is set forth to provide a thorough understanding of embodiments of the present invention. However, it will be apparent to one skilled in the art that these specific details may not be required to practice the embodiments of the present invention. In other instances, well-known circuits, devices, and programs are shown in block diagram form to avoid unnecessarily obscuring embodiments of the present invention.

Figure 1:
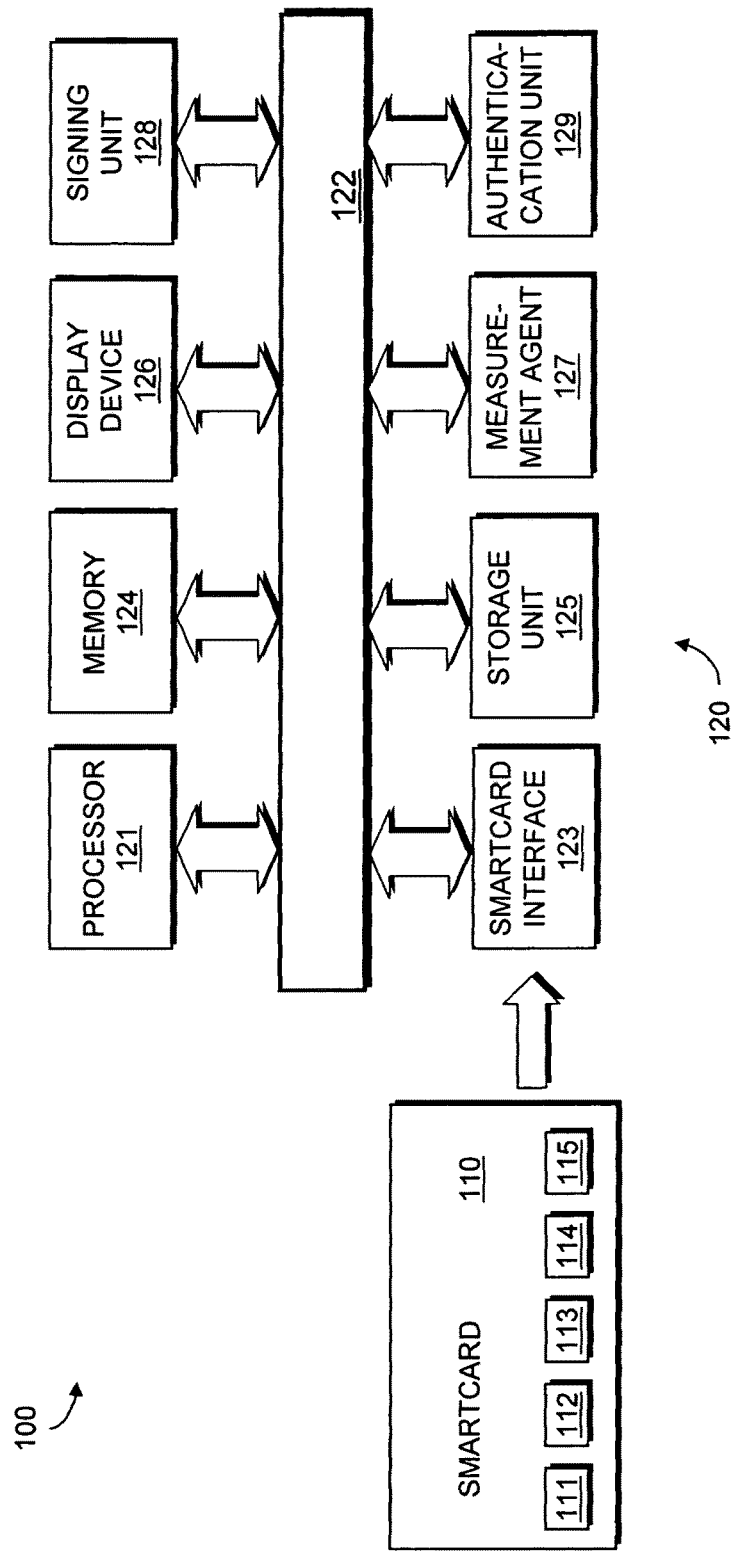
FIG. 1 is a block diagram of a smart card system according to an embodiment of the present invention.

FIG. 1 is a block diagram of a smart card system 100 according to an embodiment of the present invention. The smart card system 100 includes a smart card 110 and a smart card reader 120. The smart card 110 includes a processor 111 that processes data signals. The processor 111 may be a microprocessor implemented by a single chip or a processor implemented by a plurality of chips. The smart card 110 includes a memory 112. The memory 112 may store instructions and code that may be executed by the processor 111. The memory 112 may be implemented with a dynamic random access memory device, a static random access memory device, or other memory device. The smart card 110 includes storage unit 113. The storage unit 113 may store trust data. This data may be used to describe a smart card reader in terms of the attributes and states of its components. For example, the trust data may include cryptographic measurements of trusted and untrusted smart card readers and smart card reader components. The smart card 110 includes an indicator 114 that outputs an indication to a user of the smart card 110. The indicator 114 may be a visible indicator such as a light, an audible indicator such as a speaker, or other type of indicator. Alternatively, the indicator 114 may cause the smart card 110 to vibrate, change temperature or generate other types of indications. The smart card 110 includes input/output interface 115. The input/output interface 115 allows the smart card 110 to communicate with the smart card reader 120.

The smart card reader 120 includes a processor 121 that processes data signals. The processor 121 is coupled to other components of the smart card reader 120 via bus 122. The smart card reader 120 includes a smart card interface 123. The smart card interface 123 allows the smart card reader 120 to communicate with the smart card 110 via its input/output interface 115. The smart card reader 120 includes a memory 124. The memory 124 may store instructions and code represented by data signals that may be executed by the processor 121. The smart card reader 120 includes storage unit 125. The storage unit 125 may store data such as instructions and code, certificates (credentials) for attributes of components and keys on the smart card reader 120, a private key for the smart card reader 120, and other data. The smart card reader 120 includes a display device 126 that outputs data and other information to a user. The smart card reader 120 includes a measurement agent 127. The measurement agent 127 generates a measurement value. According to one embodiment, measurement values represent attributes of components or states of the smart card reader 120. The smart card reader 120 includes a signing unit 128. The signing unit 128 includes a unique asymmetric signing key, protected by its hardware, that may be used to generate digital signatures for data. It should be appreciated that the measurement agent 127 and signing unit 128 may be implemented as a single combined measurement/signing unit. In this embodiment of the invention, additional measurement agents (not shown) may be used to generate measurement values. The combined measurement/signing unit may be used to generate digital signatures for the measurement values from the additional measurement agents. The smart card reader 120 includes an authentication unit 129. The authentication unit 129 collects authentication data. The authentication data may be non-physical data and/or biometrics.

According to an embodiment of the present invention, the smart card 110 tests the smart card reader 120 for trustworthiness. This may be achieved by transmitting a request to the smart card reader 120 for its trust data and determining whether the data received is acceptable. The trust data may include, for example, certificates and/or other signed data describing attributes of components on the smart card reader. In response to determining the trustworthiness of the smart card reader 120, the indicator 114 on the smart card 110 provides an indication of the trustworthiness to the user.

Figure 2:
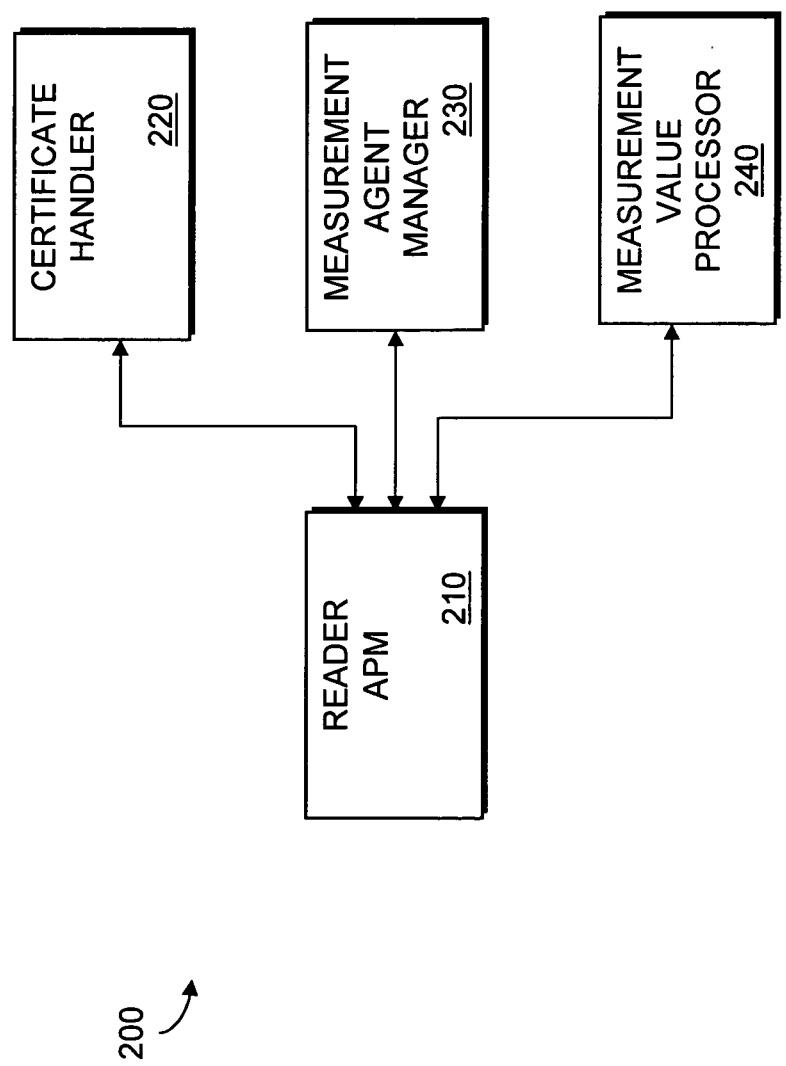
FIG. 2 is a block diagram of smart card reader attestation unit according to an embodiment of the present invention.

FIG. 2 is a block diagram of smart card reader attestation unit 200 according to an embodiment of the present invention. According to an embodiment of the smart card reader 120 (shown in FIG. 1), the smart card reader attestation unit 200 is implemented in software and resides in memory 124 (shown in FIG. 1) of the smart card reader 120 as sequences of instructions. It should be appreciated that the modules may also be implemented by hardware or a combination of both hardware and software.

The smart card reader attestation unit 200 includes a reader attestation protocol module (APM) 210. The reader attestation protocol module 210 prepares trust data to be transmitted to the smart card 110 in response to receiving a request or challenge from the smart card 110 to prove the reader's trustworthiness. The reader attestation protocol module 210 may also receive a nonce from the smart card 110 to be included in the trust data to be transmitted back.

The smart card reader attestation unit 200 includes a certificate handler 220. The certificate handler 220 interfaces with the storage unit 125 (shown in FIG. 1) of the smart card reader 120 to retrieve appropriate certificates to be transmitted to the smart card 110 in response to requests from the reader attestation protocol module 210. The certificates may include certificates associated with components on the platform of the smart card reader 120. These certificates may include a cryptographically signed description of a manufacturer, model number, or other information of a component and a public key that may be used for verification of the signature. The certificates may also include certificates associated with conformance testing. These certificates may include a cryptographically signed indicator of validation to some specification and a public key that may be used for verification of the signature. According to an embodiment of the smart card reader attestation unit 200, each public key transmitted includes a certificate signed by a certifying authority that attests to the public key's authenticity. According to an embodiment of the present invention, the certificate may be compliant with the X.509 v3 digital certificate standard (published April 2002).

The smart card reader attestation unit 200 includes a measurement agent manager 230. The measurement agent manager 230 interfaces with a measurement agent 127 and retrieves measurement values from the measurement agent 127 to be transmitted to the smart card 110 in response to requests from the reader attestation protocol module 210. Measurement values may represent information regarding a component or state of the smart card reader 120. The measurement values may include a value indicating whether the smart card reader 120 has been tampered with, data associated with a version of software running on the smart card reader 120, or other measurement values that may be generated dynamically.

The smart card reader attestation unit 200 includes a measurement value processor 240. The measurement value processor 240 interfaces with a signing unit 128 that cryptographically signs the measurement values generated by the measurement agent. According to an embodiment of the smart card reader attestation unit 200, the measurement value processor 240 combines the measurement values with a nonce received from the smart card 110 such that a cryptographic signature may be generated.

According to one embodiment of the present invention, the reader attestation protocol module 210 transmits with the measurement data, the cryptographic signature for the trust measurement data, certificates from the measurement agents and signing unit, and certificates from a certifying authority that authenticates the certificates from the measurement agents and signing unit.

Figure 3:
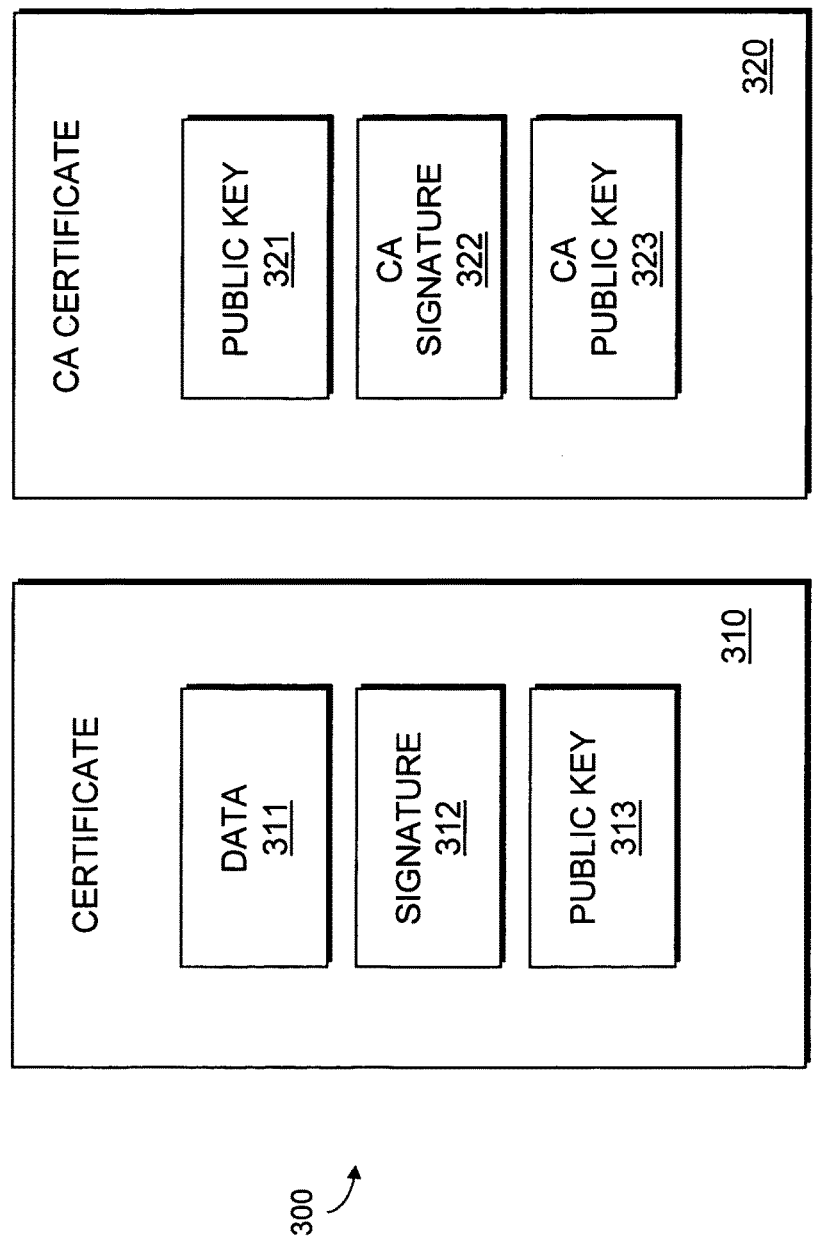
FIG. 3 illustrates trust data from a smart card reader according to an embodiment of the present invention.

FIG. 3 illustrates trust data 300 that may be transmitted by a smart card reader according to an embodiment of the present invention. The trust data 300 may be used to describe pre-configured components and properties of a smart card reader. The trust data 300 includes one or more certificates 310. The certificate 310 includes data 311 about one or more properties or components of the reader. If the component(s) are hardware component(s), for example, the data 311 may be a manufacturer or model number of the hardware component. The data may also relate to diagnostic test results performed on component(s). The certificate 310 includes a digital signature 312. The signature 312 may be generated by performing a hash function on the data 311 to form a digest, and encrypting the digest with a private key corresponding to the entity generating the signature. The certificate 310 includes a public key 313. The public key 313 may be used to verify the signature 312.

Trust data 300 may include one or more certificates 320 from trustworthy certifying authority(ies). The certificate 320 includes data 321 that includes a public key corresponding to the entity generating the signature 312 and may be used to attest to the trustworthiness of the signature key for certificate 310. According to an embodiment of the present invention where the signature 312 is authentic, the public key in data 321 is the same as the public key 313. The certificate 320 includes a digital signature 322. The signature 322 may be generated by performing a hash function on the public key 321 to form a digest, and encrypting the digest with a private key corresponding to the trustworthy certifying authority. A public key corresponding to the trustworthy certifying authority may be used to verify the signature 322. The public key may be stored as 323 on the certificate 320. It should be appreciated that the certificate 320 from the certifying authority need not be included in the trust data 300. The public key for the entity generating the signature 312 may be known and stored on the smart card 110 (shown in FIG. 1). In this example, no certifying authorities for that certificate need to be used.

FIG. 400 illustrates exemplary trust data 400 that may be transmitted by a smart card reader according to a second embodiment of the present invention. The trust data 400 may be used to describe measurement values that are generated dynamically by the component(s) generating and signing the measurement values. The trustworthy data 400 includes a signed data 410. The signed data 410 includes information that attests to the trustworthiness of the measurement process. The signed data 410 includes data 411 which includes the actual measurement values. According to an embodiment of the present invention, the data 411 also includes the nonce received from the smart card requesting the trust data 400. The signed data 410 includes a digital signature 412. The signature 412 may be generated by performing a hash function on the data 411 to form a digest, and encrypting the digest with a private key corresponding to the signing unit. The signed data 410 includes a public key 413 corresponding to the private key of the signing unit. The public key 413 may be used to verify the signature 412. According to an embodiment of the present invention, the entity generating the measurement values 411 and the entity generating the signature 412 are the same.

The trust data 400 includes certificate 420. The certificate 420 includes information that attest to the trustworthiness of the measurement/signing (M/S) unit that generated measurement values 411 and signature 412. The certificate 420 includes data which is a public key that may be used to verify the signature 412. The certificate 420 includes digital signature 422. The signatures 422 may be generated by performing a hash function on the data 421 to form a digest, and encrypting the digests with a private key corresponding to a certifying authority generating the signature 422. The certificate 420 includes public key 423 that corresponds to the certifying authority generating the signature 422

Figure 4:
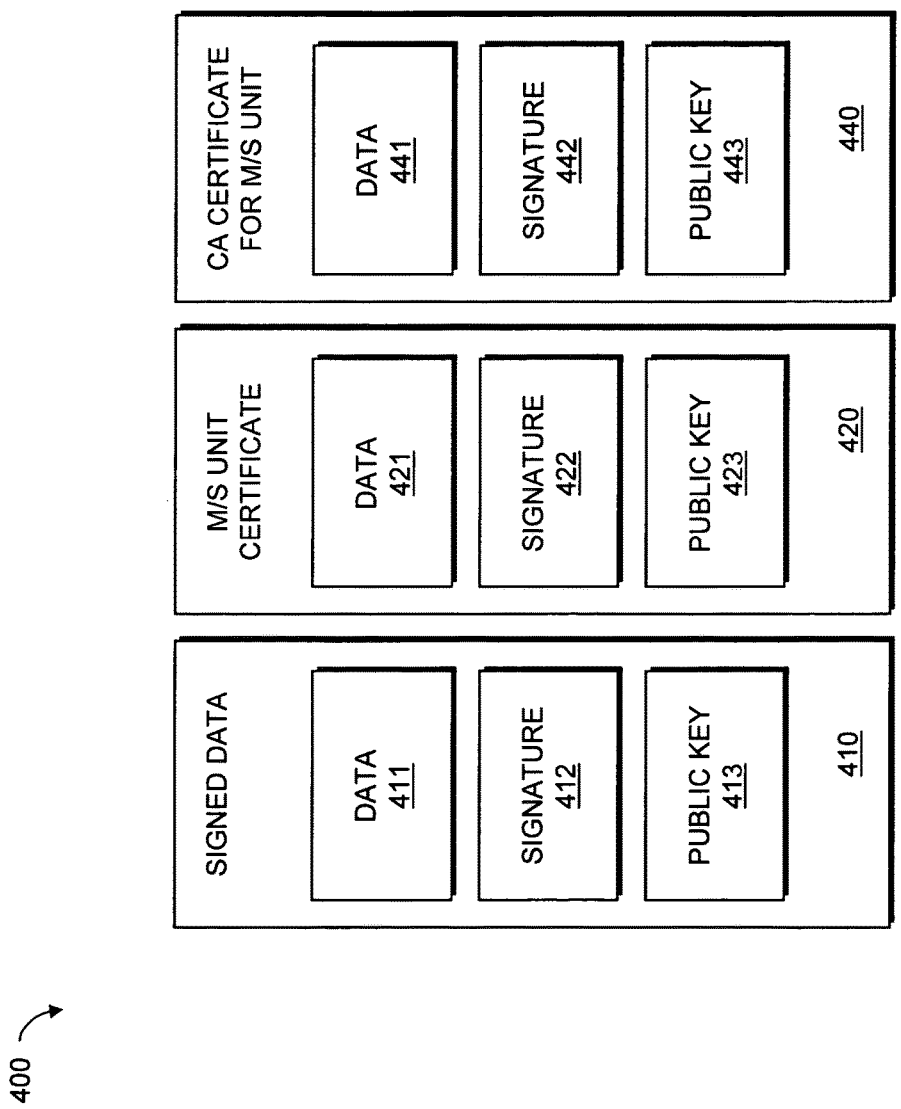
FIG. 4 illustrates trust data from a smart card reader according to a second embodiment of the present invention.

Trust data 400 may include a certificate 440 from a trustworthy certifying authority. The certificates 440 includes data 441 which include the public key corresponding to the certifying authority and may be used to attest to the trustworthiness of the certificate 420. The certificate 440 include digital signature 442. The signature 442 may be generated by performing a hash function on the data 441 to form a digest, and encrypting the digest with a private key corresponding to the trustworthy certifying authority. A public key 443 corresponding to the trustworthy certifying authority may be used to verify the signature 442. Alternatively, the public key corresponding to the certifying authority generating signature 422 may be known and stored on smart card 110 (shown in FIG. 1). In this example, certificate 440 need not be included in the trust data 400. FIGS. 3 and 4 show exemplary embodiments of trust data. It should be appreciated that trust data 300 and 400 may include additional and/or differing types of data.

Figure 5:
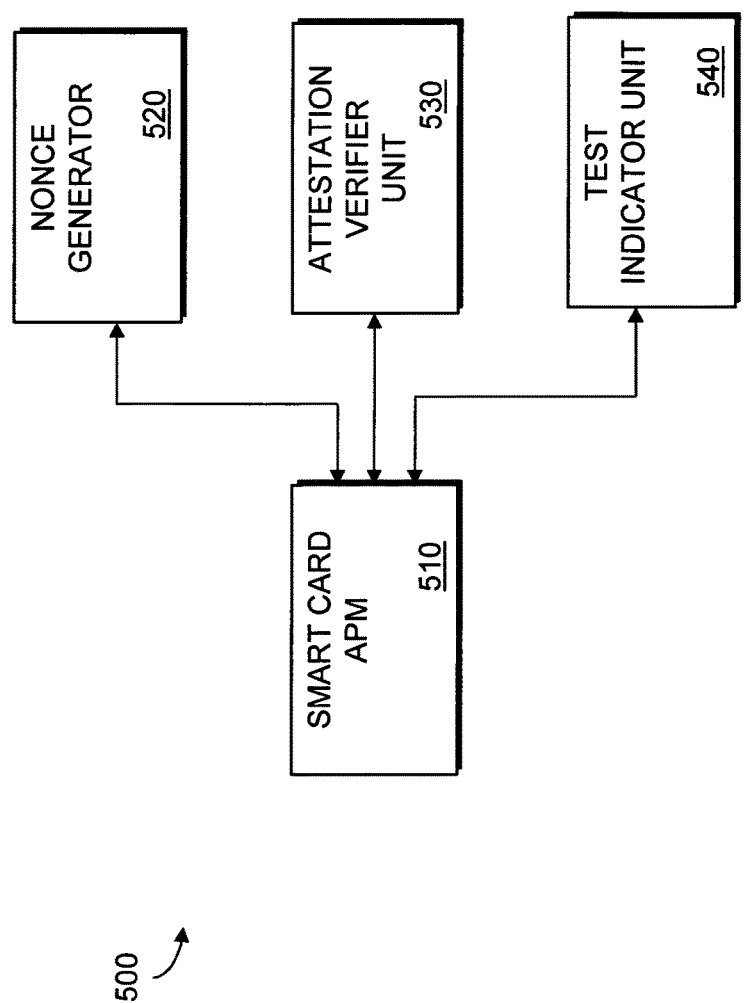
FIG. 5 is a block diagram of a smart card attestation unit according to an embodiment of the present invention.

FIG. 5 is a block diagram of smart card attestation unit 500 according to an embodiment of the present invention. According to an embodiment of the smart card 110 (shown in FIG. 1), the smart card attestation unit 500 is implemented in software and resides in main memory 112 (shown in FIG. 1) of the smart card 110 as a sequence of instructions. It should be appreciated that the modules may also be implemented by hardware or a combination of both hardware and software.

The smart card attestation unit 500 includes a smart card attestation protocol module (APM) 510. The smart card attestation protocol module 510 sends a request or challenge to the smart card reader 120 (shown in FIG. 1) to prove its trustworthiness. The smart card attestation protocol module 510 may also transmit a nonce that will then be included in the trust data to be transmitted from the smart card reader 120.

The smart card attestation unit 500 includes a nonce generator 520. The nonce generator 520 generates a nonce ("number used once") that is transmitted to the smart card reader 120 along with a request to prove its trustworthiness. By having the smart card reader 120 transmit the nonce with the trust data, the smart card 110 adds a layer of security to allow detection of replayed trust data from a reader.

The smart card attestation unit 500 includes an attestation verifier unit 530. The attestation verifier unit 530 determines whether the smart card reader 120 is trustworthy from the trust data received from the smart card reader 120. According to an embodiment of the smart card attestation unit 500, the attestation verifier unit 530 verifies the signatures of the certificates received and determines whether the data describing attributes of the smart card reader 120 are acceptable.

The smart card attestation unit 500 includes a trust indicator unit 540. The trust indicator unit 540 interfaces with an indicator 114 (shown in FIG. 1) on the smart card 110 and prompts the indicator 114 to give an indication of the trustworthiness of the smart card reader 120 in response to the attestation verifier unit 530. According to an embodiment of the smart card attestation unit 500, the trust indicator 540 may prompt the indicator 114 to turn on a light, generate an audible sound, and/or produce other indications of the trustworthiness of the smart card reader 120.

Figure 6:
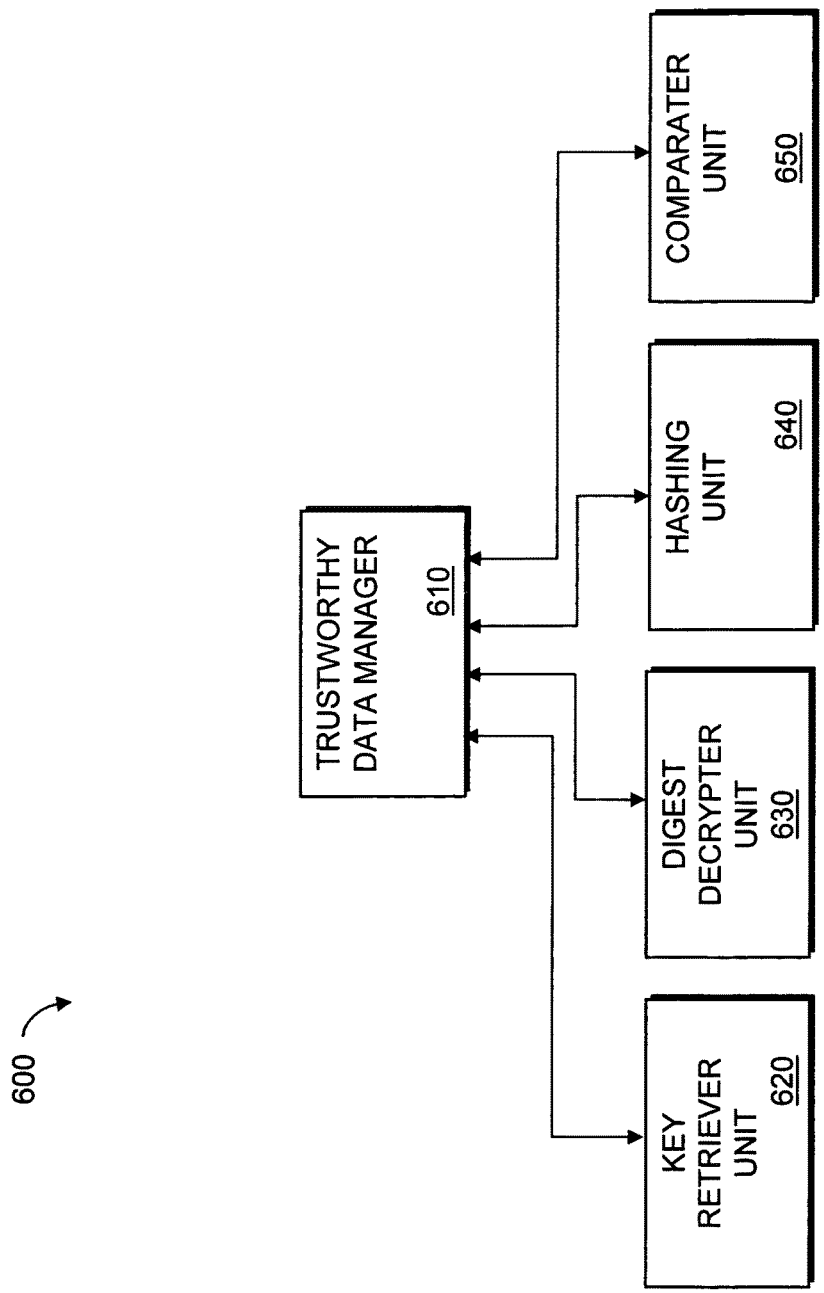
FIG. 6 is a block diagram of an attestation verifier unit according to an embodiment of the present invention.

FIG. 6 is a block diagram of an attestation verifier unit 600 according to an embodiment of the present invention. The attestation verifier unit 600 may be used to implement the attestation verifier unit 530 shown in FIG. 5. The attestation verifier unit 600 includes a trust data manager 610 that receives the trust data generated by the smart card reader 120 (shown in FIG. 1) and coordinates the verification of signatures and evaluation of data.

The attestation verifier unit 600 includes a key retriever unit 620. The key retriever unit 620 retrieves the appropriate key for verifying a signature on a certificate. For certificates originating from a certifying authority, the key retriever unit 620 may retrieve a public key associated with the certifying authority from the storage unit 113 of the smart card 110 (shown in FIG. 1). For certificates originating from a source other than a certifying authority, the key retriever unit 620 may retrieve a public key associated with the certificate from the certificate itself or from the storage unit 113. According to one embodiment, a hash of the public key can be stored instead of the public key in order to save storage space. In this case, the hash must be compared to the hash of the provided public key and then the provided pubic key is used to decrypt.

The attestation verifier unit 600 includes a digest decrypter unit 630. The digest decrypter unit 630 receives a key retrieved from the key retriever unit 620. The digest decrypter unit 630 decrypts a signature in a certificate generated by a private key corresponding to the public key. The decrypted signature is referred to as a decrypted digest.

The attestation verifier unit 600 includes a hashing unit 640. The hashing unit 640 performs a hash function on data in a certificate to generate a digest.

The attestation verifier unit 600 includes a comparator unit 650. The comparator unit 650 compares the digest generated by the hashing unit 640 with the digest decrypted from a signature by the digest decrypter unit 630. If the digests match, the comparator unit 650 determines that the signature is trustworthy and the signature is verified. The comparator unit 650 may further compare the data, which may include attributes or states of the smart card reader 120, with acceptable attributes and states to determine whether the smart card reader 120 is trustworthy. When performing comparisons, the comparator unit 650 is capable of processing data having dynamic properties (dynamic data) such as position and time. For example, a smart card able to determine its position may be able to process conditions where the smart card's coordinates are part of a trust equation. It should be appreciated that other types of dynamic data may also be processed by the comparator unit 650.

Figure 7:
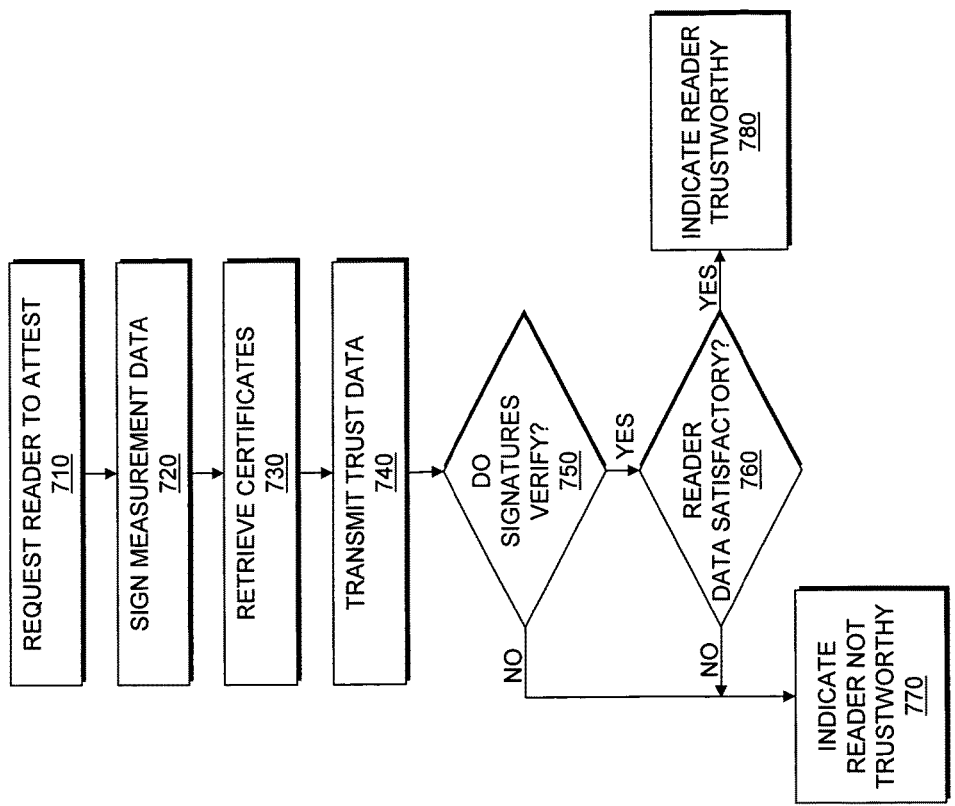
FIG. 7 is a flow chart illustrating a method for establishing trust in a smart card reader according to an embodiment of the present invention.

FIG. 7 is a flow chart of a method for establishing trust in a smart card reader according to an embodiment of the present invention. At 710, a request to attest is generated by a smart card and transmitted to a smart card reader. The request to attest challenges the smart card reader to prove its trustworthiness. According to an embodiment of the present invention, a nonce is generated by the smart card and transmitted to the smart card reader with the request to attest.

At 720, measurement values are signed by the smart card reader in response to receiving the request to attest. According to an embodiment of the present invention, a hash function is performed on the measurement values and the nonce received from the smart card to generate a digest. The digest is signed by a private key of a signing unit on the smart card reader.

At 730, certificates are retrieved. According to an embodiment of the present invention, certificates associated with components responsible for generating the measurement values, signing the measurement values, and/or other functions of the smart card reader, and certificates generated by a certifying authority associated with attesting to the trustworthiness of these certificates are retrieved.

At 740, trust data is transmitted to the smart card. According to an embodiment of the present invention, the signed measurement values and certificates retrieved are transmitted to the smart card.

At 750, it is determined whether the signatures are trustworthy and verifiable. According to an embodiment of the present invention, one or more public keys associated with a trustworthy certifying authority are first used to determine the trustworthiness of a certificate(s) signed by the certifying authority. Thereafter, public keys in the certificate(s) generated by the certifying authority are used to determine the trustworthiness of other certificates transmitted by the smart card reader. If the signatures in the certificates are trustworthy, control proceeds to 760. If the signatures in the certificates are not trustworthy, control proceeds to 770.

At 760, data in the certificates that correspond to attributes and/or states of components of the smart card reader are compared with acceptable and unacceptable attributes and/or states of the components of the smart card reader. According to one embodiment, if a nonce is sent the nonce received is compared with the nonce sent. If the data is not acceptable, control proceeds to 770. If the data is found to be acceptable, control proceeds to 780.

At 770, an indication is generated to indicate that the smart card reader is not trustworthy.

At 780, an indication is generated to indicate that the smart card reader is trustworthy.

FIG. 7 is a flow chart illustrating a method of establishing trust in a smart card reader according to embodiments of the present invention. Some of the techniques illustrated in this figure may be performed sequentially, in parallel or in an order other than that which is described. It should be appreciated that not all of the techniques described are required to be performed, that additional techniques may be added, and that some of the illustrated techniques may be substituted with other techniques.

In the foregoing specification the invention has been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. A smart card, comprising:
   an attestation protocol module that sends a request to a smart card reader to attest its trustworthiness;
   a measurement agent manager that receives a signed measurement value of a component of a smart card reader from the smart card reader and a certificate associated with the component, wherein the signed measurement value represents an attribute of the component or state of the smart card reader, and wherein the signed measurement value is generated by performing a hash function;
   an attestation verifier unit that verifies a signature associated with the certificate or the signed measurement value and that performs a test on a smart card reader by comparing the measurement value of the component of the smart card reader with a measurement value stored on the smart card; and
   an indicator, on the smart card, that outputs an indication to a smart card user of whether the smart card reader passed the test.

2. An article of manufacture comprising a non-transitory machine accessible medium including sequences of instructions, the sequences of instructions including instructions which when executed causes the machine to perform a method, comprising:
   sending a request to a smart card reader to attest its trustworthiness;
   receiving a signed measurement value of a component of a smart card reader from the smart card reader, and a certificate associated with the component, wherein the measurement value represents an attribute or state of the component of the smart card reader, and wherein the signed measurement value is generated by performing a hash function;
   verifying a signature associated with the certificate or the signed measurement value; and
   testing a smart card reader by comparing the measurement value of the component of the smart card reader with a measurement value stored on a smart card, wherein the comparing is performed on the smart card.

3. A method for testing a smart card reader, comprising:
   sending a request to a smart card reader to attest its trustworthiness;
   receiving a signed measurement value of a component of the smart card reader from the smart card reader, and a certificate associated with the component, wherein the signed measurement value represents an attribute or state of the component of the smart card reader, and wherein the signed measurement value is generated by performing a hash function;
   verifying a signature associated with the certificate or the signed measurement value;
   testing the smart card reader by comparing the measurement value of the component of the smart card reader with a measurement value stored on a smart card, wherein the comparing is performed on the smart card; and
   outputting an indication to a smart card user of whether the smart card reader passed the test using an indicator on the smart card.

4. The method of claim 3, wherein the indicator comprises a light.

5. The method of claim 3, wherein the indicator comprises a speaker.

6. The method of claim 3, wherein the indicator comprises a vibrator.

7. The method of claim 3, wherein the indicator comprises a temperature changer.

8. The method of claim 3, wherein the test determines whether the smart card reader has been compromised.

9. The method of claim 3, wherein the test determines whether the smart card reader is reliable.

10. The method of claim 1, wherein the test determines whether the smart card reader has been compromised.

11. The smart card of claim 1, wherein the test determines whether the smart card reader is reliable.

12. The article of manufacture of claim 2, wherein the method further comprises providing an indication of whether the measurement value of the component matches the measurement value stored on the smart card to a smart card user, wherein the providing is achieved by using an indicator on the smart card.

13. The smart card of claim 1, wherein the indicator comprises a light.

14. The smart card of claim 1, wherein the indicator comprises a speaker.

15. The smart card of claim 1, wherein the indicator comprises a vibrator.

16. The smart card of claim 1, wherein the indicator comprises a temperature changer.

17. The article of manufacture of claim 12, wherein providing the indication comprises flashing a light.

18. The article of manufacture of claim 12, wherein providing the indication comprises generating a sound.

19. The article of manufacture of claim 12, wherein providing the indication comprises generating a vibration on the smart card.

20. The article of manufacture of claim 12, wherein providing the indication comprises changing a temperature of the smart card.

21. A method for testing a smart card reader, comprising:
sending a request to a smart card reader to attest its trustworthiness;
receiving a test result of a component of the smart card reader from the smart card reader, and a certificate associated with the component, wherein the test result pertains to an attribute or state of the component of the smart card reader;
verifying a signature associated with the certificate;
testing the smart card reader by comparing the test result of the component of the smart card reader with a test result stored on a smart card, wherein the testing is performed by the smart card; and
having the smart card output a sound to indicate to a smart card user that the test result of the component matches the test result stored on the smart card using an indicator on the smart card.

22. The method of claim 21, wherein testing the smart card reader comprises comparing a measurement value in the data with a measurement value stored in the smart card.

23. The method of claim 21, wherein testing the smart card reader comprises comparing nonce in the data with a nonce generated for an attestation request.

24. A method for testing a smart card reader, comprising:
sending a request to a smart card reader to attest its trustworthiness;
receiving a test result of a component of the smart card reader from the smart card reader, and a certificate associated with the component, wherein the test result pertains to an attribute or state of the component of the smart card reader;
verifying a signature associated with the certificate;
testing the smart card reader by comparing the test result of the component of the smart card reader with a test result stored on a smart card, wherein the testing is performed by the smart card; and
vibrating the smart card to indicate to a smart card user that the test result of the component matches the test result stored on the smart card using an indicator on the smart card.

25. The method of claim 24, wherein testing the smart card reader comprises comparing a measurement value in the data with a measurement value stored in the smart card.

26. The method of claim 24, wherein testing the smart card reader comprises comparing nonce in the data with a nonce generated for an attestation request.

27. A method for testing a smart card reader, comprising:
sending a request to a smart card reader to attest its trustworthiness;
receiving a test result of a component of the smart card reader from the smart card reader, and a certificate associated with the component, wherein the test result pertains to an attribute of state of the component of the smart card reader;
verifying a signature associated with the certificate;
testing the smart card reader by comparing the test result of the component of the smart card reader with a test result stored on a smart card, wherein the testing is performed by the smart card; and
changing a temperature on the smart card to indicate to a smart card user that the test result of the component matches the test result stored on the smart card using an indicator on the smart card.

28. The method of claim 27, wherein testing the smart card reader comprises comparing a measurement value in the data with a measurement value stored in the smart card.

* * * * *